United States Patent [19]

Brown et al.

[11] Patent Number: 5,060,140
[45] Date of Patent: Oct. 22, 1991

[54] UNIVERSAL PROGRAMMABLE DATA COMMUNICATION CONNECTION SYSTEM

[75] Inventors: Alexander S. Brown, Hopkinton, Mass.; James T. Hirni, Hollis, N.H.; Bruce S. Allen, Concord, Mass.

[73] Assignee: Jupiter Technology Inc., Waltham, Mass.

[21] Appl. No.: 819,884

[22] Filed: Jan. 16, 1986

[51] Int. Cl.$^5$ .................................................. G06F 1/00
[52] U.S. Cl. .................................. 364/200; 364/281.3; 364/240.8; 364/284
[58] Field of Search ... 364/200 MS File, 900 MS File, 364/300

[56] References Cited

U.S. PATENT DOCUMENTS

| | | | |
|---|---|---|---|
| 4,058,672 | 11/1977 | Crager et al. | 370/60 |
| 4,286,322 | 8/1981 | Hoffman et al. | 364/200 |
| 4,399,531 | 8/1983 | Grande et al. | 370/60 |
| 4,414,624 | 11/1983 | Summer, Jr. et al. | 364/200 |
| 4,476,347 | 10/1984 | Haggen et al. | 370/60 |
| 4,488,289 | 12/1984 | Turner | 370/60 |
| 4,513,373 | 4/1985 | Sheets | 364/200 |
| 4,604,686 | 8/1986 | Reiter et al. | 379/93 |
| 4,614,841 | 9/1986 | Babecki et al. | 902/39 |
| 4,645,874 | 2/1987 | Fildes | 379/93 |
| 4,766,534 | 8/1988 | DeBendictis | 364/200 |
| 4,800,521 | 1/1989 | Carter et al. | 364/900 |

OTHER PUBLICATIONS

"Lan Software Links Diverse Machines, OS's", John Row, Mini-Micro Systems, Sep. 1985, pp. 141-147.

Primary Examiner—Stuart N. Hecker
Assistant Examiner—Rebecca L. Rudolph
Attorney, Agent, or Firm—Weingarten, Schurgin, Gagnebin & Hayes

[57] ABSTRACT

A universal programmable data communication connection system which is user programmable to provide a selective data path between one or more data source and one or more data destination. The data connection system allows the user to "patch" signals from source to destination with simple commands. The system then provides the data path and conversion processes through selection among prestored process tasks or "softblocks" which are connected to "sockets" by software "wires". Within a finite capacity, one or more data paths of varying degrees of complexity may be connected or disconnected, at operator command, without interruption of existing or non-altered system connections and functions. If the data source and data destination are of different format and/or protocol, the connection system can also provides the corresponding data processing to maintain an uninterrupted flow of data.

13 Claims, 9 Drawing Sheets

UNIVERSAL PROGRAMMABLE DATA COMMUNICATION CONNECTION SYSTEM

FIELD OF THE INVENTION

The present invention relates to data communication systems, and in particular, communication systems for providing a data flow between incompatible systems or media.

BACKGROUND OF THE INVENTION

Various networks and communication systems exist having different format and protocol standards. Each manufacturer would wish to maintain the distinction and uniqueness of its own standards, to encourage the user to remain within that structure. However, the user of a system which may have multiple standards, or which communicate with systems having different communication standards or protocols, would ideally wish to eliminate the differences between the standards and protocols, to freely transfer data within and among all systems and elements. Moreover, as each technical advance spurs additional changes in communication standards, it appears to be unlikely that a standard protocol and format of data transfer can or will be adopted. It is therefore important to the user of any one data system, or the would-be purchaser of such a system, to maintain as much flexibility in data transfer as possible, and not become constrained into any particular format. Therefore, it would be most advantageous to the user to be provided a system having a flexible interconnect system to provide protocol and format adaptation for data transfer over a variety of media and between a variety of data equipment. Moreover, the connection and disconnection of such data transfer between elements and systems should be made with a minimum of operator intervention and skill, and without interrupting data transfer then in progress.

SUMMARY OF THE INVENTION

This present invention is a software system for providing a universal user-programmable data communications connection system, residing in a general-purpose data communications protocol processor. The system is user-programmable at two levels: first, by providing software modules for processing of received data and for retransmission, the system can support fully transparent data exchange between incompatible data communications protocol systems; and second, by providing an operator control language for connection and disconnection of these modules, the system provides technician-level installation and maintenance of such a protocol conversion system, without reprogramming. Operator control of connections between software modules (connection, disconnection, and reconnection) takes place without loss of data.

The system is conceptually a "breadboard" for design and implementation of real-time communications software systems using modular software and a universal connection system. Each software module or softblock has a number of input sockets and output sockets; a wire connection provides a data path between an output socket and an input socket. The number and type of softblocks present change dynamically as the operator adds and deletes softblocks and connections.

Standardized softblocks protocol modules, discussed below, and serial interface elements are presented to the user as independent function blocks which are connected with data paths that can be disabled, rerouted, and enabled in real time; the picture the user sees is a "soft patch panel" that can interconnect a large number of asynchronous or synchronous serial devices through a number of asynchronous or synchronous serial devices through a user-friendly interface, both at the system engineer level and at the terminal user level. During configuration and in real-time patch panel operations, no user programming is necessary, and the level of expertise required may be at the technician level.

The software environment that provides this interconnection is called the "switching system" of the communications processor. The routing of data is among the protocol modules, and the execution status of the protocol modules is controlled by the operator control through the processor. User control via keyboard terminal interface is resident in I/O processor and provides a very "robust" implementation which is relatively insensitive to operator and user errors, load variation, and even protocol module failures. As a result, the switching system provides modularity and layering, and concealment of implementation, both from predefined application protocol modules and among other components of the switching system. Moreover, the robust implementation provides full error recovery in normal operation, and graceful degradation during load surges and abnormal conditions. The system also provides implementation tools for debug, test, validation, monitor, and analysis for good user interface, to both programmer and operator.

The switching system according to the present invention provides the network of protocol-data processing modules with connections that permit data messages to flow among them, on request of the software at the modules using a set of message operation routines. In these operations, each module knows only about its connection endpoints, or sockets, and knows nothing about connections originating and terminating at these sockets. These message operations use the facilities of the underlying scheduler to provide event-driven scheduling of the processing at the modules themselves. Control over the configuration of the network (both module and connection states) is provided by a set of supervisory functions that are themselves high-priority concurrent activities subject to event-driven scheduling; these supervisory components, with other functions distributed across the multiprocessor system, form the user's real-time interface to the system during operation.

This results in a division of the system into three layers. A first "message services layer," simulating a "soft patch panel" to the user, is provided by a scheduler kernel plus a library of message transmission and reception operations used by all other parts of the system to move data. This message layer completely conceals the underlying scheduler and kernel, so that reimplementation of the kernel is invisible to the upper layers of the software system. A second "protocol layer" includes the protocol-data processing network itself, comprising modules and connections. A third "supervisory layer" comprises control components and other distributed components of the system. The connections among modules carry messages, memory buffers of various sizes that contain protocol packets or byte stream segments. Formatting of these messages is protocol-specific. A module may contain more than one task or concurrent activity, if necessary to process data in two or more directions; cooperation is achieved through common data structures controlled by semaphores (flags). To implement these semaphores, "event" connections (nonqueued, unbuffered messages) are provided, but are not visible to the user.

The software architecture of the invention is based on a network of arbitrary complexity connecting a large number of asynchronously scheduled concurrent message processing software modules. Connection "wires" carry queued buffered data "messages." Flow control (blocking, with timeout, of module scheduling on absence of a message, or queue-full error) is available on both the transmitting and receiving ends of each message path. Messages are passed among processing modules using operations contained in a library. This message level switching system is characterized by a repertoire of message operations determined by input or output request type, single or multiple sockets, whether message or event and the wait or proceed control on flow control error (blocking or nonblocking). An additional operation permits the requestor to wait for an arbitrary combination of messages or events. In addition, the receive control information (nonblocking), the transmit status information (non-blocking), the transmit status and receive command (blocking), and the transmit request and receive service (blocking) comprise special message operations required to interact with the supervisory level and system services.

BRIEF DESCRIPTION OF THE DRAWING

These and other features according to the present invention will be further understood by reading the following detailed description, together with the drawing, wherein.

DETAILED DESCRIPTION OF THE INVENTION

Figure 1:
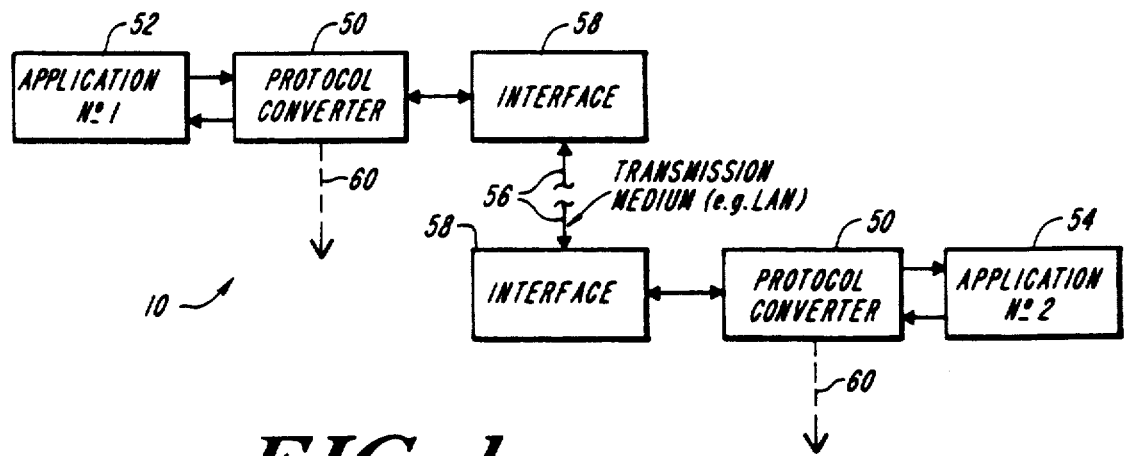
FIG. 1 is a block diagram of a data transmission between two data applications through a transmission medium connected by the system according to the present invention.

The software system according to in the present invention maintains its essential properties regardless of implementation in a particular hardware or software environment, as seen by both programmer and operator. Many terms used herein are standard common terminology in software engineering: standard texts such as "Data Structures and Algorithms" (Aho, Hopcroft, and Ullman, Addison-Wesley, 1983) provided extended definitions and discussions of these terms and concepts and such texts are included by reference herein. In addition, the following terms are defined:

Softblock: A functional component in the communications protocol processing system, according to the present invention, which may be connected with other system blocks into a network of arbitrary complexity, is a process which can process available data input into the desired data output. A process is a cluster of one or more concurrent tasks that cooperate to provide the service defined for a softblock module.

Wire connection: A software connection between softblock sockets which provide a route for data flow between processes, and comprise a finite-length but flow-controlled queue.

Language Interpreter (LI): The primary operator interface to the system according to the present invention.

Module: An executable image loaded into memory, of a softblock code in the system according to the present invention.

Protocol processing module (PPM): The reentrant code provided for data processing required by a softblock. "Reentrant" means that more than one system softblock may be executing the code concurrently, under control of a system scheduler.

Instance: The softblock provides a template from which copies, or instances are made which are themselves executable. The softblock header defines sockets, initial values for parameters and the location of code to be executed. Although the process tasks are independently scheduled by the system multitasking kernel, the system operator does not have direct control of individual tasks, but does have direct control of the process. The softblock module provides a template from which instances are copied which are themselves executable.

Process: One execution in the system according to the present invention of a module. The process consists of one or more concurrent "tasks" (instances of execution of parts of the module's code), and all the resources required by the tasks to perform the required processing. These resources include: "sockets" permitting connections between the softblocks; "common" memory shared by tasks for parameters, workspace, etc.; and "message buffers," dynamically allocated memory elements that can be passed freely among softblocks in the system.

Process label: Execution of the process is controlled through a single data structure, its "label." It contains information necessary to control execution of one or more tasks within the process, provide access to data structure common to these tasks, and resolve message connections to other modules.

Task: One of several concurrent instances of execution within a process, which cooperate to process between a data input and a data output.

Path: End-to-end route of data flow through a system.

Socket: Endpoint of a connection at a softblock.

Message: A data buffer transferred between processes on any processor in the system network. In implementation, the address of a globally allocated area of memory is placed on a queue implementing a connection. Its ownership is also transferred from the sending to the receiving process using other data structures.

Interprocessor communication (IPC): A connection can exist between processes on different processors exactly as if the processes were executing in the same processor. Messages on these connections are carried in "interprocessor communication" messages, implemented using the interprocessor "soft interrupt" facility in the Hostprocessor and Input Output processor hardware defined below. These connections are functionally identical to local connections.

Queue: Standard software FIFO with flow control, implementation of 'connection'.

Path control manager (PCM): The "path control manager" is understood to be the principal executive function in the present system and is responsible for initiation, control, and termination of all processes and connections in the system, in response to requests of the LI user. The PCM is a distributed function with "global" portions in the HP, closely associated with the LI, and "local" portions in each IOP functioning as agents of the global portion and monitoring process activity.

Capital initial prefixes are used to distinguish the position of components in the layered model. Names of components in the message services layer begin with "M" (Mesasge) or "W" (Wire); names of application-specific components in the protocol layer being with "X" (e.g., X 25) prefix; and names of other components in the protocol layer begin with "Y" (process), "P" (PCM), "C" (IPC), or "B" (BA).

A general system application 10 is shown in FIG. 1, which includes a data transfer between two different applications 52 and 54 having different data and protocol formats. The information is to be transmitted over a particular transmission medium 56 such as may be provided by a local area network, known in the art. Since the local area network has particular hardware and data transfer requirements, a corresponding interface 58, which may comprise a modem or more sophisticated communications equipment, the protocol converter 50 according to the present invention communicates with each application 52 and 54 to the corresponding interface 58 to provide a data transfer which is acceptable by the interface 58 and the transmission medium 56, as well as to the other corresponding application. The protocol converter according to the present invention provides the required data and protocol format conversions, as well as access 60 to other applications (not shown).

Figure 2:
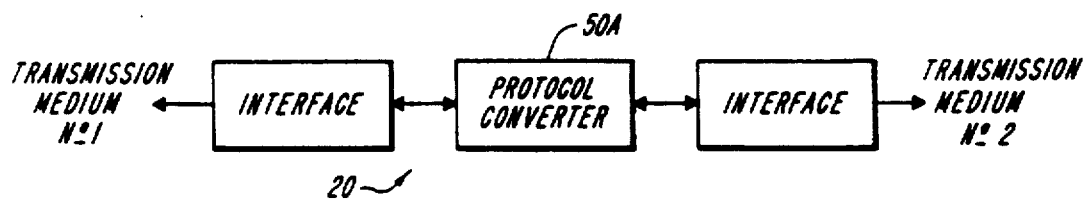
FIG. 2 is a block diagram of data transmission between different transmission mediums connecting the system of the present invention.

Another specific application 20 of the protocol converter according to the present invention 50A is shown in the block diagram of FIG. 2. The protocol converter provides the interconnection between two different transmission media after being received by the appropriate hardware interface.

Figure 3:
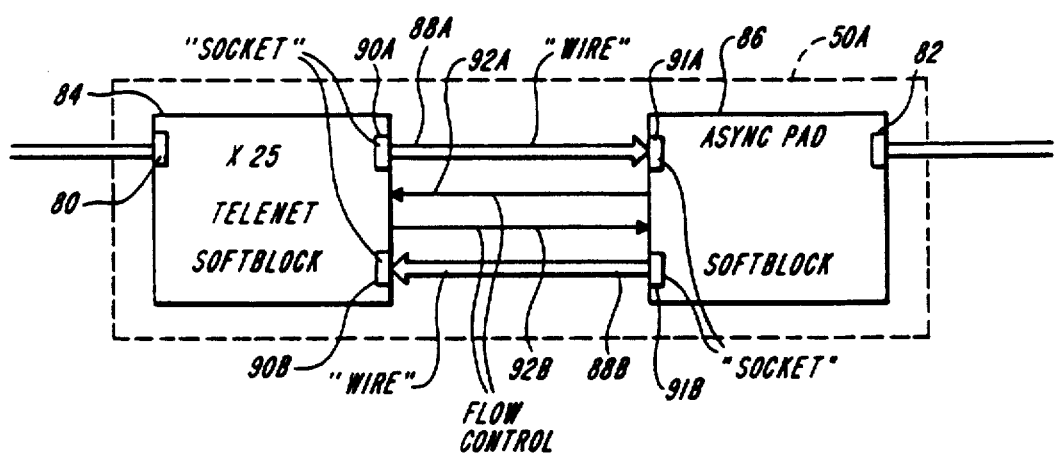
FIG. 3 is a block diagram showing a protocol converter including two connected softblocks according to the present invention.

The protocol converter 50A is shown in greater detail in FIG. 3. Data is received from each hardware interface 80 and 82, respectively. The information is transferred to specific tasks 84 and 86, which provide the data and protocol translation process. The tasks 84 and 86 are connected by software wires 88, which connect the tasks 84 and 86, as well as the interfaces 80 and 82 by their sockets 90. The wires provide a data transfer between the sockets and comprise a first-in first-out data buffer (209), having a corresponding flow control signal path 92, which is provided by the receiving socket to allow the transmitting socket to provide the next piece of data. The allocation of the sockets and the connection of the various tasks or processes by wires 88 is defined by a data label, discussed below. Therefore, a system can be configured or reconfigured according to the particular socket 90 and wire 88 allocation, as defined by the softblock end defined by operator control (not shown).

Figure 4:
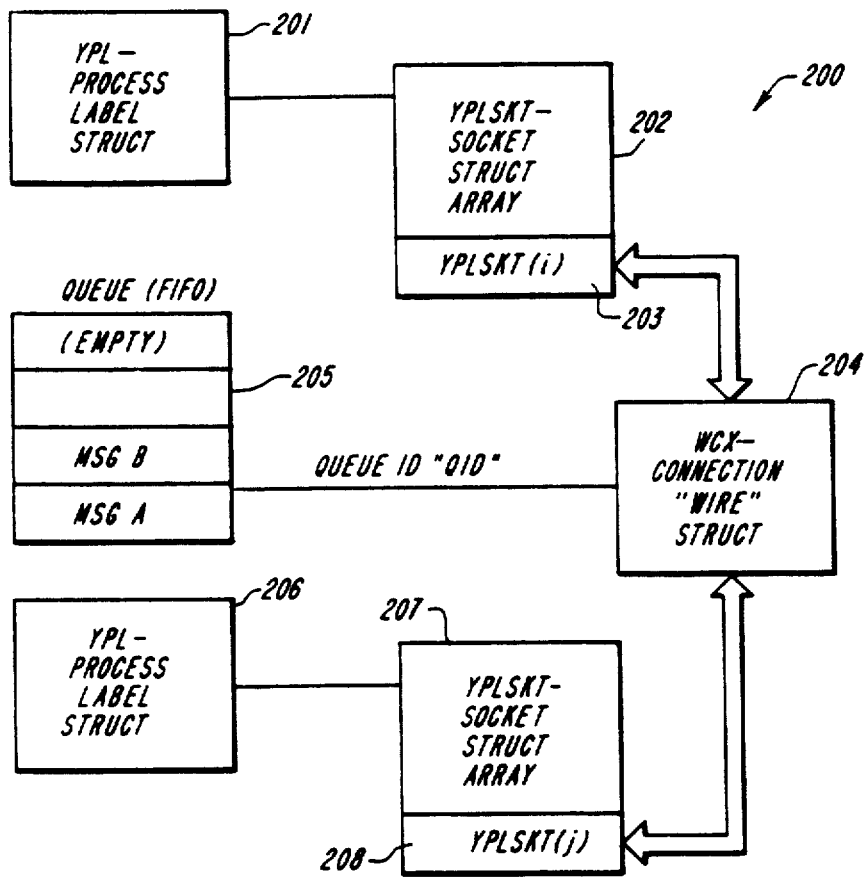
FIG. 4 is a block diagram showing the data structures implementing connection of a two softblock structures.

The interconnection of the label defined structures previously used in the system configurations shown in FIGS. 1-3 is also shown in FIG. 4. In the configuration of structures 200 shown in FIG. 4, two softblocks 201 and 206 are interconnected by a softblock wire 204 wherein a common queue 205 is referenced by the socket structure array data 202 and 207 for the respective softblock elements 201 and 206. As described elswhere, the individual softblock elements 201 and 206 are reproduced from prestored softblock templates from which individual software images are produced in particular parts of memory which are subsequently executed as an "instance." The individual softblocks typically comprise data communication processing elements which are executed by an individual processor wherein they reside and are executed according to a particular defined priority. Such priority based execution provides a system which supports concurrent operation, of the processes defined by each softblock, and except for the necessary time dependent transfer interrelationships described in FIGS. 6 and 7, may be executed in a time independent mode.

Figure 5:
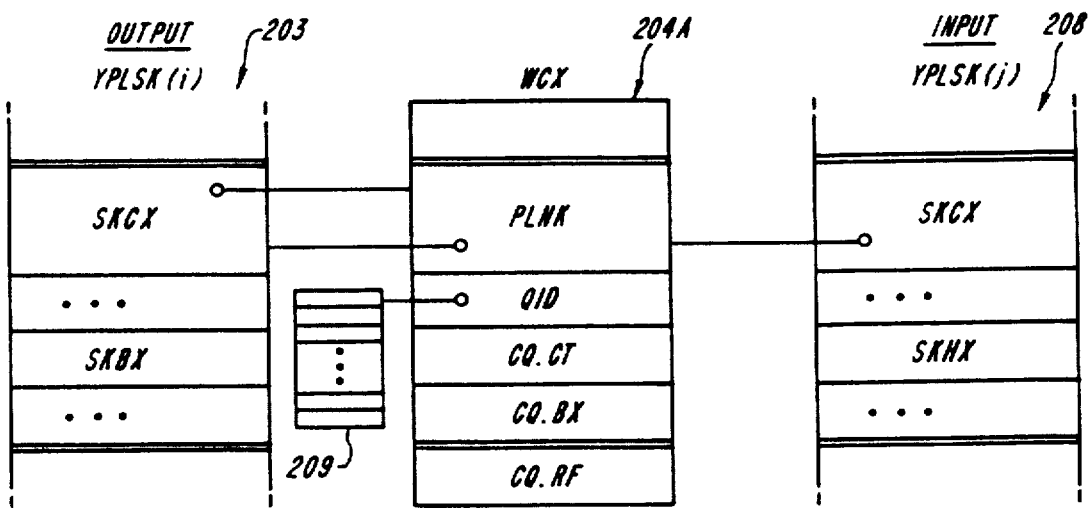
FIG. 5 is a diagram showing detail of the wire structure of FIG. 4.

The fundamental data path in the system is a connection, also called a process label link or plak, between sockets labeled skcx of blocks. This may be thoght of as a software implementation of a "wire" in the patchpanel analogy, or a "pipe" in a plumbing analogy. After establishment of the wire connection between the sockets, a specific data transfer according to the socket array structure data areas 206 and 201 is shown in FIG. 5. The wire connection 204A, including data in the first-in first-out queue 90A of FIG. 3, provides an area 209 whereupon the output data from the socket array data 203 area and the input socket data array area 208 may be transferred.

Figure 6:
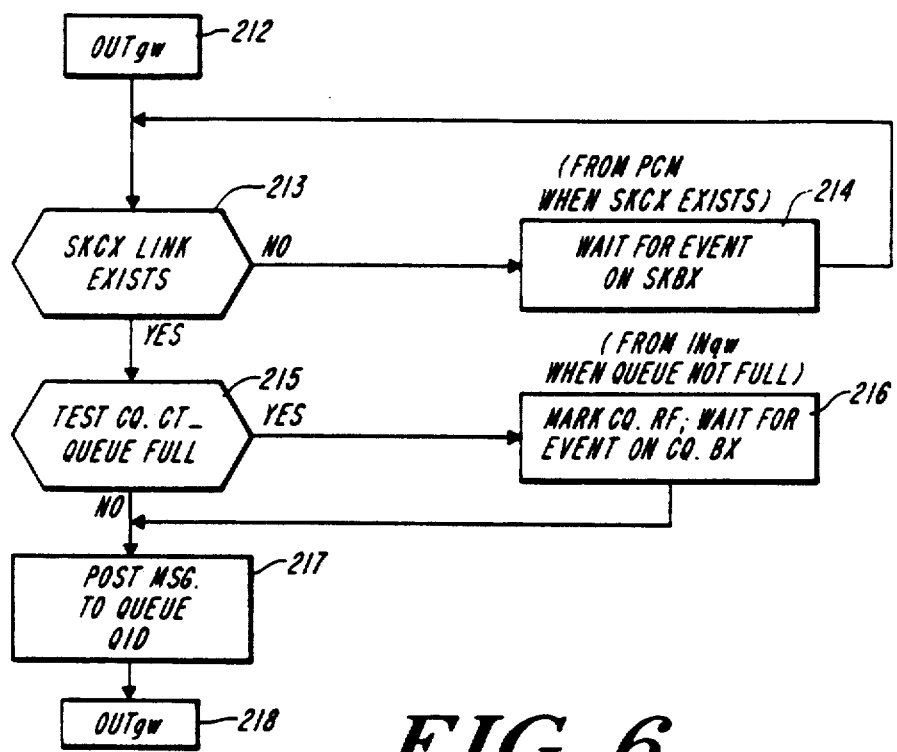
FIG. 6 is a flow chart showing outgoing data transfer.
Figure 7:
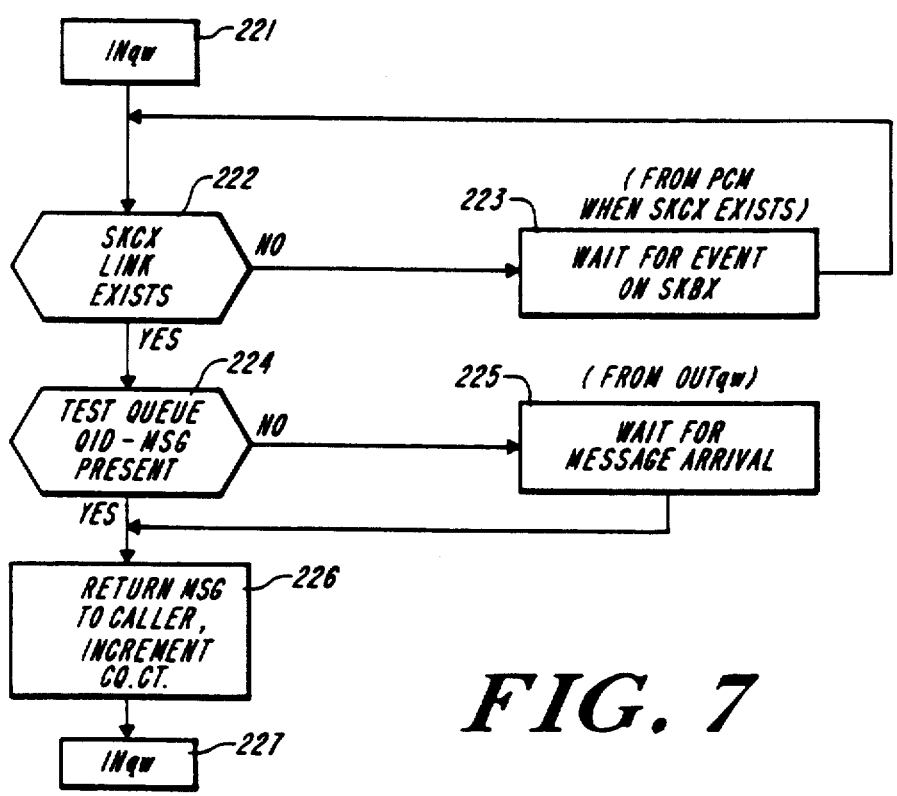
FIG. 7 is a flow chart showing incoming data transfer.

In addition to providing a data exchange path, the softblocks also include provision for flow control of data transfer. The flow charts of FIGS. 6 and 7 provide illustration of flow between the output and input message operations, wherein both message operations include a step for waiting for a message arrival. If the connection itself has been changed since the last execution interval, the connection access starts at the individual socket element. The operation shown blocks or inhibits on the connection itself only when a valid connection shows a queue full or empty, depending on the direction of the desired access. In FIG. 6, the execution of an outgoing data flow begins at 212. It must first be determined if a socket connection link, skcx, exists at step 213, and a wait state is entered at 214 if no such link exists to wait for an event in a socket mailbox, skbx. If a socket connection link exists at step 213, and if the connection queue counter, cq. ct, is full at step 215, the system marks the connection queue resource flag, cq. rf, and enters a wait state at 216 until a flow control event in a mailbox cq. bx occurs to indicate the presence of message data. Subsequently, the message is posted to the queue as identified in the queue ID at step 217, thus completing the outgoing transfer of data at 218.

The incoming transfer, INqw of data shown in FIG. 7 beings at step 221, from which point the system determines if a socket connection link exists at step 222. If no link exists, the system waits at step 223 until notification of an event on the mailbox counter cq. bx occurs. If a socket link exists as determined at step 222, the queue defined by the queue ID is examined to see if a message is present at step 224. If no message is present, the system waits for the arrival of a message in step 225. Subsequent to steps 224 and 225, a message is returned to the caller, and increments the queue counter, cq. ct at step 226. The incoming data transfer is then completed at step 227.

Referring back to FIG. 3, the queue data structures store messages until they are requested. This queue is permanently associated with the input end 90B, 91A of the connection so that data is not lost when the connection is broken and remade by operator control. The queue providing storage in the connection has a fixed, finite length. The ownership of queues or memory buffers is transferred to socket 91A, softblock 86 as they are removed from the queue at the input end socket. If a failure occurs, all buffers present in the queue at the time of failure, as well as all buffers owned by softblock 86, are flushed and returned to the global memory allocator.

Data flow control is provided in the following conditions when the queue is empty at an input socket 91A, the task in softblock 86 calling the INqw message operation waits until it arrives; when the queue is full, the task in softblock 84 calling the OUTqw (FIG. 6; q=queue, w=waits until received) message operation waits until space is made available by removal of a message at socket 91A of softblock 86. The second condition requires notification from socket 91A of softblock 86 to socket 90A of softblock 84 when flow control is in effect, and an element is removed from the queue. If the connection is broken, its data is emptied at socket 91A of softblock 86 until no more messages exist; the INqw (FIG. 7) message operation then waits until messages arrive. Softblock 86 is unaware that the connection is broken, other than absence of data at the socket. Similarly, if the connection is broken, the task calling OUTqw at socket 90A of softblock 84 is made to wait until a connection exists at the socket. The condition is precisely analogous to flow control when a connection exists. Softblock 84 is unaware that the connection is broken, other than halted data flow at the socket. The broken connection condition can be detected in softblock 84, however, by use of the OUTq (no wait) message operation, which returns an error code showing absence of connection rather than queue full. Moreover, Operator control of the connection may occur at any time.

"Event" connections have neither queue nor flow control; a single longword of information, either coded or numeric, is passed through a connection. Event connections are private to the PPMs that use them; that is while the module's programmer can use event connections freely to provide coordination among the tasks of a process, the system manager and operator are unaware of their existence and cannot manipulate them.

Figure 8:
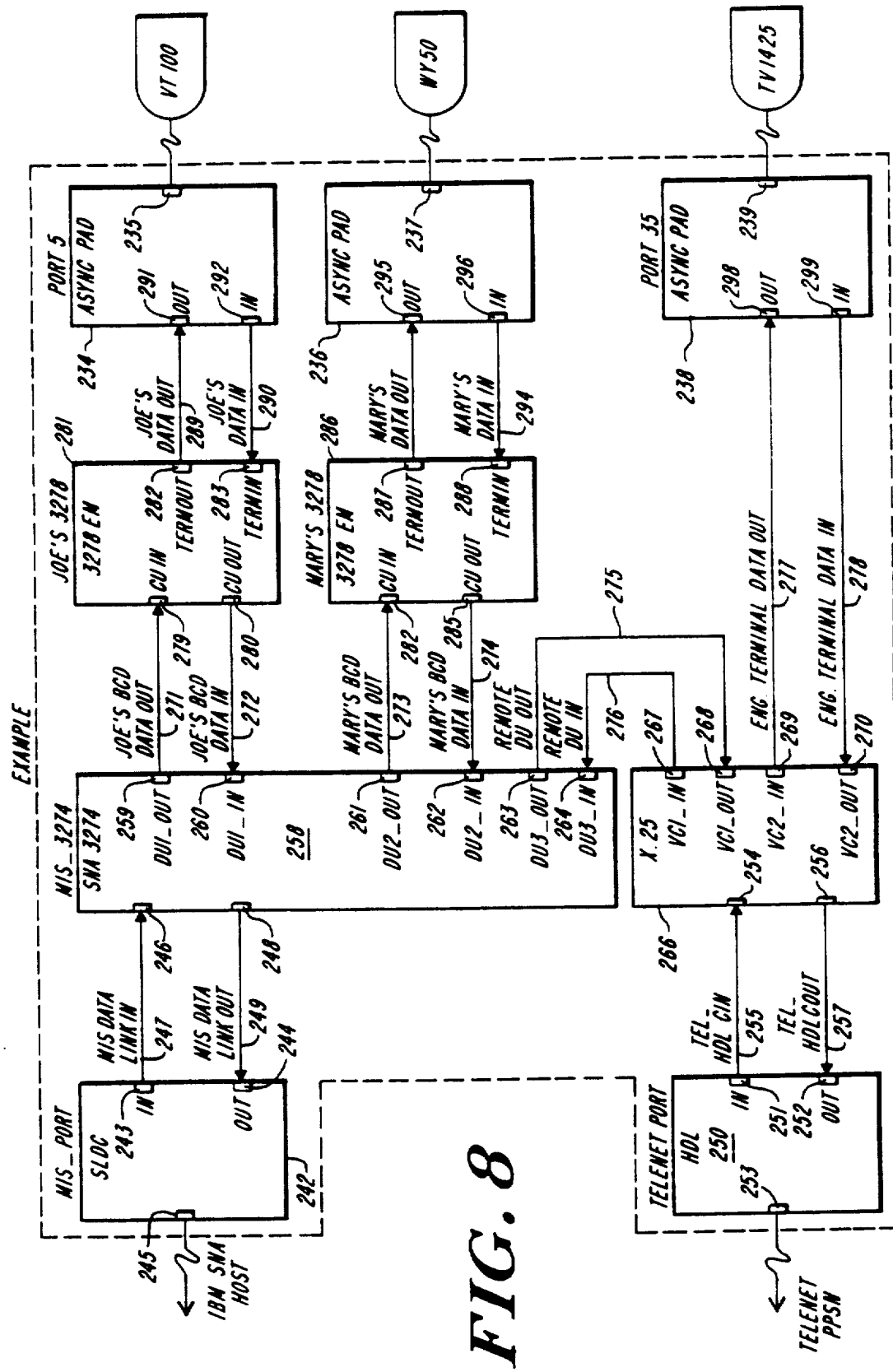
FIG. 8 shows a configuration example of a softblock data system according to the present invention.

An example of a programmable data communication connection system made in accordance with the present invention is shown in FIG. 8. Softblock elements 242 and 250 include input sockets 243, 251 and out sockets 244 and 252, respectively. Furthermore, the softblock 242 includes hardware interface apparatus 245 with which to connect to a transmission medium, such as the IBM standard format, and softblock 250 contains a similar hardware interface 253 to connect to a transmission medium, for instance a Telenet transmission format. The signals provided on socket 243 of softblock 242 are provided to the softblock 258 (which emulates a 3274 system) at socket 246 via wire 247. Similarly, the signals conveyed to the port softblock 242 is received by port 244 from the softblock 258 output socket 248 via wire 249. Similarly, the softblock 250 provides data from socket 251 to softblock 266 (which emulates an X.25 system) by socket 254 via wire 255. The data provided by softblock 266 socket 256 is provided by a wire 257 to softblock 250. Similarly, the softblocks 234, 236, 238 also include sockets for software connection thereto and hardware interfaces which provide known data and electrical format connections to a variety of data equipment, such as to data terminals on RS232C format connections.

As can be seen in FIG. 8, the system provides a data path between the IBM media and the Telenet media via softblocks 242, 258, 266, and 250, to paths providing an interconnection therebetween. For brevity, it will be appreciated that each path comprises a wire as previously defined, as well as having a socket at either end in the correspondingly connecting softblock. Furthermore, the flow control indicated at 92 in FIG. 3 also exists between all connected softblocks in FIG. 8 although not shown explicity. Continuing on, a data path also exists between the softblock 258 and port 5 softblock 234 through the softblock 281, which in this example provides an emulation of an IBM 3278 system. The data flow connections therebetween are provided accordingly to wires as previously discussed. The softblock 258 also provides a path to the port 6 softblock 236 via a 3278 emulator softblock 286 and corresponding data paths connected therebetween. The X.25 softblock 266 is connected to the port 35 softblock 238 according to wires providing connection therebetween. The example demonstrated by FIG. 8, and other programmable data communication connections according to the present invention is configured according to a particular software system also an aspect of the present invention now described below.

Figure 11:
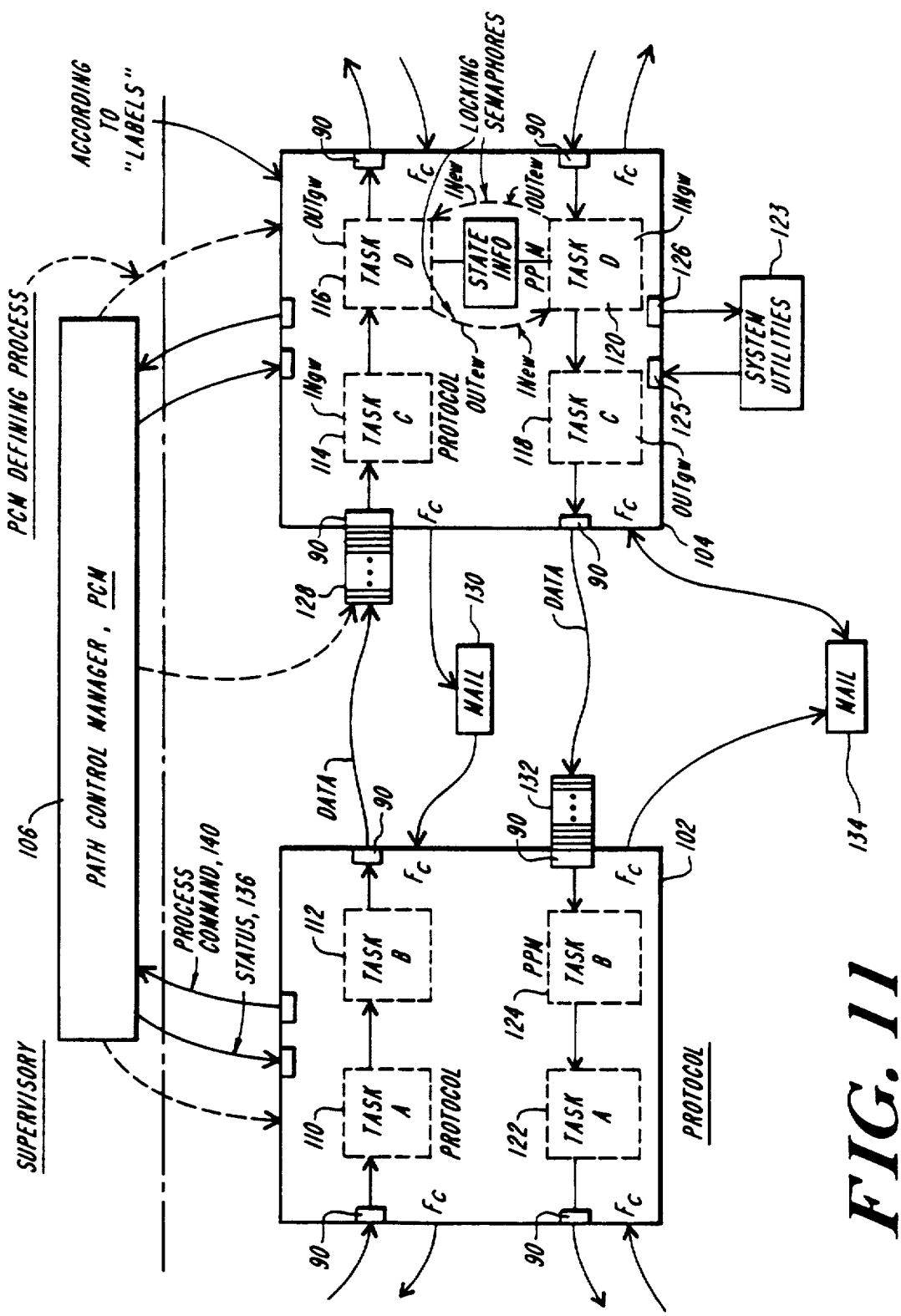
FIG. 11 is a detailed block diagram showing the implementation of the InputOutput processor.

The protocol converter 50 can be configured to comprise a plurality of tasks which may be interconnected or independently directed to provide operator-specified data flow paths. A portion of such a system is described generally in FIG. 9, revealing the major functional components of the protocol converter according to the present invention. As shown in FIG. 11, the supervisory and protocol functions are clearly distinguishable, wherein the protocol function provides protocol processing modules 102 and 104 (up to a larger number) to provide the above-mentioned tasks. The existence of the protocol processing modules, their interconnection and their operation, is provided by the path control manager 106, which provides the supervisory function. Meanwhile, a third, message layer of system operation provides the transfer data according to the operator system configuration. Typically the protocol processing modules include at least one task, wherein the exemplified protocol processing module (PPM) 102 includes tasks 110 and 112. Similarly, the PPM 104 includes tasks 114 and 116, which may be the same for different tasks in the opposite direction of data flow. Additional system utility functions 123 are provided by the system according to the present invention and communicate with each particular PPM process by an independent data route. The PPM modules are interconnected to sockets 90 and wires which comprise a queue (a first-in first-out buffer) 128 on the corresponding input socket 90 which receives data from one PPM (102) and provides information to a second PPM 104 at the output of the queue 128. The destination for the transfer of the data from each PPM to the particular defined buffer is defined by the label which defines the PPM, and is implemented by instructing the hardware wherein the system 50 resides to transfer the data between the register associated with each PPM and each queue 128. The transfer of data proceeds until the queue 128 is full. Concurrently the data is removed by the receiving PPM. The data flow is managed by providing a flow control signal from the receiving PPM to a mail register 130, which indicates to the transmitting PPM whether the receiving PPM has received the information provided in the queue 128. Until it has indicated that receipt of such data has been made, the flow of data to the register 128 is inhibited; upon receipt by the receiving PPM, new data is provided to the queue 128 for subsequent removal by the receiving PPM. Similarly, the PPM modules may also have a corresponding flow of data in the return direction through queue 132, whose flow is indicated by data in register 134. Furthermore, the signals may be linked to additional PPMs (not shown) through corresponding transfers of data between sockets 90 of the PPMs shown and additional PPMs according to the operator-selected PPM labels.

The path control manager (PCM) 106 controls the transfer of data between the protocol processing modules as well as the operation of the tasks 110, 120 within each PPM 102, 104 according to status 136 and process 140 command signals between the PPM and PCM 106. Since the entire system 50 is typically resident in a programmable data processing computer, the structure shown in FIGS. 1-5, 8 are generated by software data structures. More significantly, each processor or softblock is not necessarily a separate portion of software, but is rather a particular execution or "instance" of a template software module or softblock copied from a template wherein same area of code may be executed at different times for different parameters to provide the same processor or softblock function for different system structural composition, such as the softblocks 110 and 122. Furthermore, the use of multiple instances (excutions) of the template reduces the system memory capacity requirement and allows for the execution of the particular softblock at different times as determined by the PCM 106.

Figure 9:
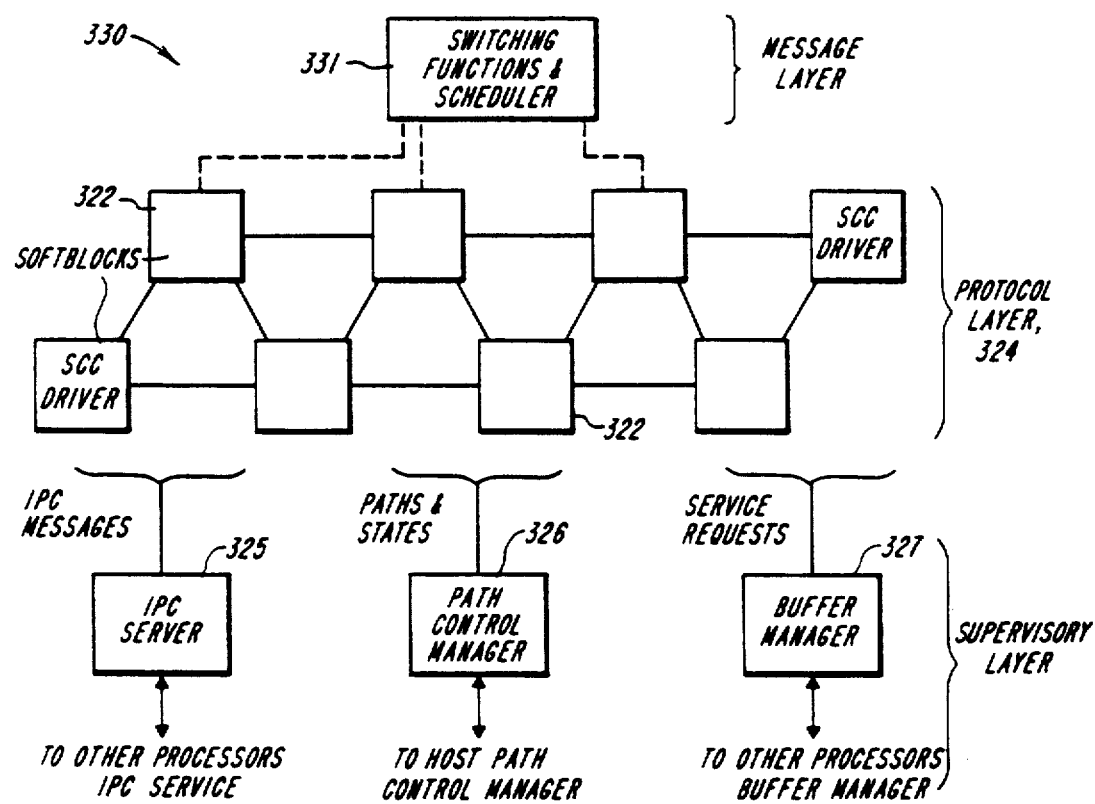
FIG. 9 is a block diagram of one IOP software of the system according to the present invention showing distinguishable supervisory and protocol layers, including path control manager and protocol processing module elements therein.

To illustrate the organization of the task (message operation) repertoire, consider a single protocol processing module PPM (50A) node in the network, with general connectivity to other PPMs (including possible event connections), as in FIG. 9 or FIG. 11.

A PPM is a code unit that is able to use switching system message operations to receive and transmit messages. When this code unit is given control, it is provided with a data structure that describes its message service points and their connections; it is then called a "process," which includes one or more "tasks" and the data structure the "process label." The labels's structure and contents are implementation-dependent, and need not be accessed by the module other than as an argument to a message operation function call.

The process label explicitly sets the limit of the PPM's knowledge of the outside world. The actual resolution of a connection is not included within the PPM, which merely provides sockets as message service points, and not as connections. The connection, then, is managed by an external entity (the PCM) and the PPM is free to use the message services available for its set of sockets.

PPMs can vary greatly in complexity according to design or need; a PPM may either be a cellular protocol building block, or a large protocol engine, or anything in between. Full generality of message services is provided to permit implementation of any existing or future protocol.

Protocol modules may receive and transmit messages or events, and must interact with supervisory and server modules. Most PPMs process data messages; the configuration of input and output message sockets distinguishes PPMs into three classical types: simplex, half-duplex, and full-duplex. The simplex PPM module comprises a single task which processes a single message socket. The module always blocks at the same point, the INqw operation that provides message input. Two general types complete the set of five PPM frameworks available as a basis for implementation. A number of utility PPMs will also be made available as necessary.

In the general case, an arbitrary number of inputs and outputs of either queue or event messages to supervisory modules and server modules are also provided. The Protocol Processing Module (PPM) may also be a source or sink of data, e.g., a communications interface driver, or a spooler to a shared device such as a printer, or a server for file transfer, or some other module that obtains or disposes of data without reference to the connection system.

A PPM defines a set of message sockets; this set of sockets may be used by more than one concurrent task in a process. In the same terminology of the message level, the task share the same module "label" through a common data area. It is up to the implementer to ensure that the message sockets presented by the label are used sensibly. This type of PPM can provide the implementer with the ability to service more than one activity at a time.

While the tasks of a softbock are scheduled independently and may have any priority relationships, they are managed as a group under certain circumstances.

While the present invention describes a general software method for constructing modular communications software, certain aspects of its design and implementation depend on its implementation in a particular system, comprising an advanced multiprocessor computer system constructed of standard microprocessor components, and specialized communications interfaces. The system is packaged in an international standard chassis and bus structure (VME). In this bus structure, a large number of independent processors, memory units, and peripheral devices may access each other in a single address space, simplifying interprocessor communications in a multiprocessor system generally shown in FIG. 10, discussed below.

The Host Processor (HP) comprises one Motorola 68010 microprocessor, a 512 KB memory, a 4 KB page memory map, a VME master interface, an industry-standard 30 MB Winchester disk drive (nonremovable), plus a 5¼" 600 KB diskette (removable), on a VME bus controller. The microprocessor receives VME peripheral interrupts, but cannot receive serial interrupts. The HP runs a real-time version of standard UNIX System III operating system, and can serve as a small time-sharing system, providing a UNIX development environment for the software described below; both HP and the I/O processor (below) are coded in the standard UNIX "C" language.

The I/O processor (IOP) comprises up to 16 Motorola 68000 microprocessors, each with 512 KB memory, unmapped, and a VME slave interface. A portion (64 KB RAM plus I/O space) of its address space is not addressable from the VME bus.

Figure 10:
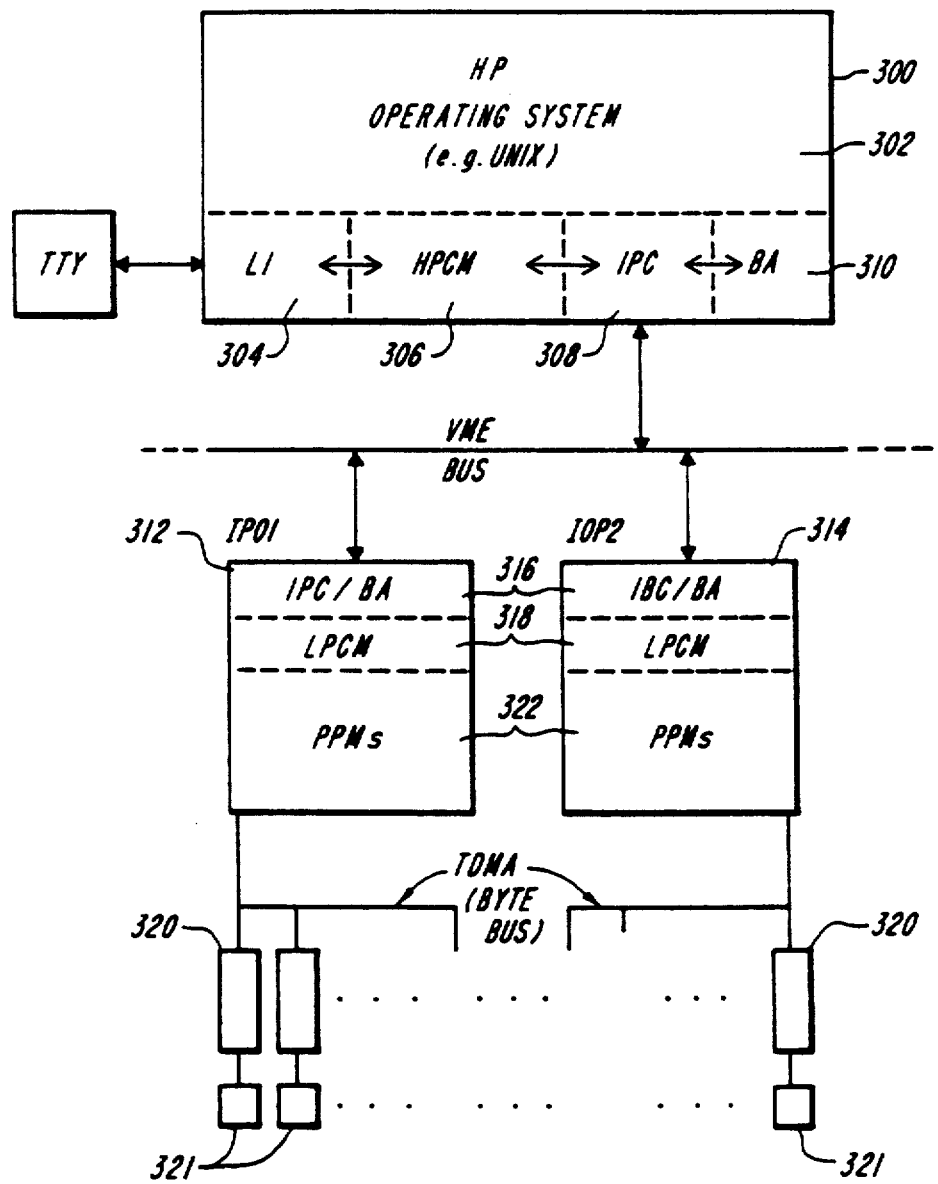
FIG. 10 is a block diagram showing the relationship of the system processor.

The hardware structure according to the present invention is shown in FIG. 10, and comprises a host processor 300 which includes a real time Unix or equivalent operating system 302, a language interpreter 304 and a host processor control module 306. The host processor 300, provides for the transparent data transfer from the host processor component processor to the individual IOP according to an interprocessor communication module 308. The system further includes a BA (buffer allocator). The host processor 300 communicates to the individual external equipment 321 connected to I/O port boards 320 through I/O processors such as the IOP 312 and 314 shown in FIG. 10. However, the system is configured to support additional numbers of IO processors (not shown as well as the corresponding additional external devices attached thereto. Each I/O processor includes an interprocessor communication module 316 as well as a logic processor control module 318. Data transfer in the IOP to each connected external device 321 includes the processing provided by protocol processing modules 322, resident on the individual I/O processors 312, 314. The I/O processors 312 and 314, include hardware discussed in further detail in patent application entitled Byte Bus, U.S. Pat. No. 4,994,960, filed concurrently with this application and incorporated by reference.

The system functions included within the I/O processor is described in greater detail the block diagram 330 of FIG. 9. The I/O processor includes its own switching functions and scheduler element 331, which control the message operations of the softblocks 322, in the protocol layer of system operations 324. The IPC server 325 also communicates with a path control manager 326, which receives which receives path and state information from the protocol layer 324. The path control manager 326, communicates with a buffer manager 327, and provides transfer of service requests from the protocol layer 324 to the host processor, along with information from the aforementioned IP server 325 and path control manager 326. The buffer manager addresses information provided on the I/O processor buffers, which is further described in the above mentioned incorporated related patent application.

Figure 12:
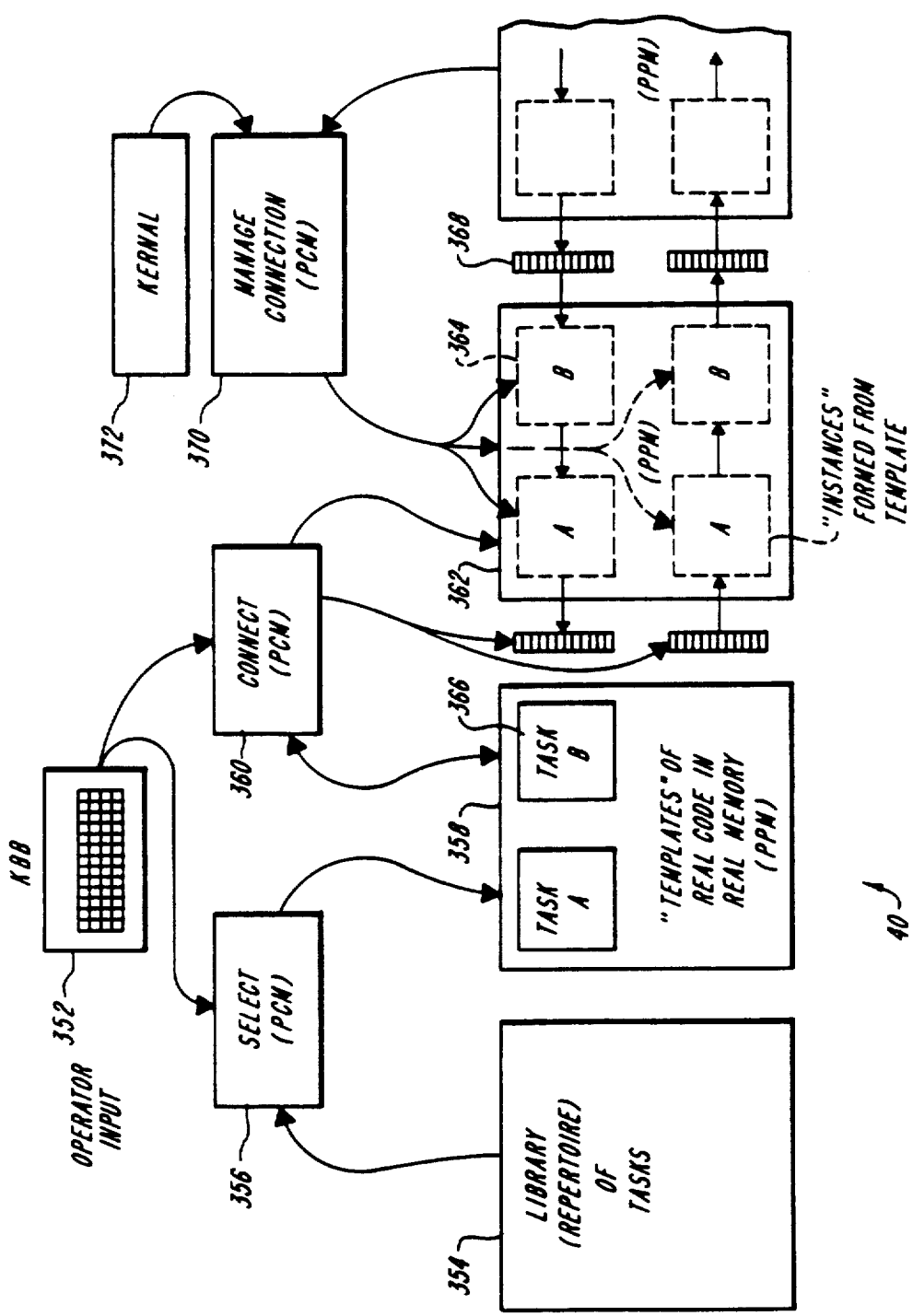
FIG. 12 shows the form left to right process of providing the data path according to the process of the present invention.

As previously mentioned, the PCM 106 also functions to create the system structure as defined by the operator as shown in FIG. 12. In the process 40, the operator selects 352 a particular task from the library of tasks 354 by operation of the PCM 356, which composes or copies the templates in real code in real memory of the processor at step 358. The tasks are arranged and connected 360 to provide the process 362 comprising the execution of various instances 364 of the task templates 366 and the connection "wires" 368. The operation of the various instances as PPMs is managed at step 370 by the operation of the kernel commercially available scheduling process 372.

The communications interface subsystem described in the incorporated patent application includes a variety of communications interfaces accessed via a time division multiplex bus from each IOP, which maps the interfaces' control registers to the IOP's address space and thus onto the VME bus. While other processors access the control registers via the VME bus, only the IOPs directly connected to the TDMA bus can receive interrupts from the communications interfaces.

A softblock or task scheduler allows the IOP software environment to be multiprogrammed so that one or more activities executing code that waits for external events from time to time may be run concurrently. These activities normally loop continuously. The software component that determines which softblock gains control next after the current softblock becomes inactive, is called a "scheduler," a component of a real-time operating system. A number of schedulers are commercially available for a variety of microprocessors; e.g., for the Motorola 68000, RMS68K (Motorola), VRTX (Hunter & Ready), and MTOS (Industrial Programming Inc.). Any of the above can serve as the scheduler "kernel" of the system according to the present invention.

A protocol processing module (PPM) is a process that performs the required operation for a protocol function. As a process, it consists of the resources required to execute a "module" of code loaded into the IOP, which includes one or more tasks, connection sockets, a work area of memory shared by the tasks (like a FORTRAN "COMMON"), and parameter definitions and other information necessary for the PPM to communicate with the rest of the system. A PPM is required to be in one of six states throughout its existence, and must respond to a supervisory command within a specified system time constant.

One or more tasks are typically required to execute the code of a PPM. Each task has a unique identifying number, and a priority number used in the scheduling algorithm. The module defines a list of tasks by entry point addresses. The process begins execution of the module with a single task executing the first entry point on the list. This task may create the rest of the tasks required by the process, and has the ability to suspend and terminate these tasks. No other task in the process may create a task. All tasks may change their scheduling priority within limits set by the module's programmer, around an absolute priority base value set by the system manager or operator.

The module also defines a list of connection "sockets," which may be either input or output, and may be either queued or unqueued. Queued sockets are defined to pass message buffers, while unqueued or "event" sockets are defined to pass only numeric or coded data. ("Event" sockets are defined primarily for use within a process, for synchronization among tasks.) Both sockets and message operations are grouped according to direction and type. Operations may also refer to more than one socket, and may either wait until message arrival, or return immediately.

In the present embodiment the HP includes a processor. A message operation on a connection between processes on two I/O processors is performed "invisibly" to the calling task through an "IPC," using a set of software functions that establish queues between processors and use the "soft interrupt" to communicate a message transfer between processors.

Each IOP contains identical facilities for creation and management of pools of memory in its own address space. When a buffer passes to another processor and is released, it must be returned to its home processor to be reunited with its pool. Moreover, its address as used in the home processor's address space must be converted to its address as seen from the destination processor. These considerations force memory allocation to be somewhat bound to the IPC facility.

The "path" or end-to-end data flow of protocol processing through several PPMs and connections is under control of the path control manager functions. Thus includes full control over the modules themselves; the PCM is therefore a "supervisor" for the entire system. The PCM is split into two components: a portion that resides in the HP and has responsibility for IOP loading and control, IPC connection and disconnection, and other system-wide functions; and a portion residing in each IOP, which has responsibility for process creation and deletion, all connections within the IOP, and other local functions. Together, the PCM components support the LI, the main user interface as seen by the operator and system manager.

A connection may be either local (connecting processes within one IOP) or remote (connecting processes on two IOPs) without the knowledge of the PPMs using the connection. The message operations used to access the connection through the sockets are responsible for data transfer through IPC queue operations rather than local queue operations. The remote connection is established and broken by the LPCMs on the IOPs involved, at the command of the HPCM, which maintains information about the end-to-end paths established.

Connections may be many-to-one as well as one-to-one and one-to-many.

The initialization routine 182 is a "C" function that is called by path control and must reutrn to its caller. It must perform any operations that should only be performed once per process invocation, such as allocation of "static" dynamic memory used for work space.

The initialization routine can only refer to and affect static memory in the process label. It cannot leave data on the task stack, because that data would not be addressable by the task mainline when it is entered at the restart entry point.

The restart entry point 184 receives control after execution of the initialization routine on softblock invocation or after execution of the cleanup routine when path control is resetting the softblock.

The restart entry point 184 performs any initialization operations that are common to initial startup and process restart, such as starting the child subtasks or sending reset messages over its application socket(s).

The softblock must emit a "BLOCK-RESET" message after it has completed the restart processing and is entering the RESET state proper.

The cleanup routine 186 is a "C" function that is called by path control on unanticipated error conditions and must return to its caller. The cleanup routine must reestablish the application conditions that prevailed after initialization when the softblock was first invoked.

Since the cleanup routine receives control from any point in application processing, the error recovery it performs requires special consideration. The supervisor will refresh the process label and the unprotected static portion of the process common from the corresponding fields in the softblock module header before the cleanup routine starts to run. The cleanup routine must be prepared to consider releasing each block of dynamic memory allocated after the initialization routine was run. For example, suppose a block uses a dynamically allocated block as a terminal screen bufer. The cleanup routine may zero the structure. However, suppose the block creates a linked list or dynamically allocated blocks in execution of the protocol on a socket. Since the protocol is being reset, the cleanup routine should free up all the list elements. In both cases, the cleanup routine must be able to find the addresses of the memory blocks. Typically this requires that all dynamic memory be pointed to by fields stored in the protected portion of the process common area.

The softlink block is in one of five states with respect to path control. When the block is first invoked until it emits the "BLOCK-RESET" status message, it is assumed to be initializing static resources. No data is processed at application sockets. The block makes the transition to RESET state as soon as initialization is complete, without prompting from path control.

The softblock signals that it has entered the RESET state by emitting a "BLOCK-RESET" status message. In the RESET state, the block has established known initial conditions but it has not yet started to process data at its applications sockets. It must be able to respond to path control commands such as SET/SHOW-BLOCK-PARAMETERS and START-BLOCK. The softblock may reject commands that it cannot honor, but must receive and respond to the command message.

The block enters the RESET state 184 from task startup 182 at the initial entry point or at the restart entry point after being reset by path control. The block makes the transition to the starting state in response to "START-BLOCK" command.

In the starting state 190, the block is in the process of allocating and initializing physical devices and performing initial handshakes with correspondents on its application sockets. When it has determined, in an application-dependent way, that it is ready to enter its normal data processing state, it emits a "BLOCK-RUNNING" status message and enteres the RUNNING state 192. In making the transition from RESET to RUNNING, the block INITIATEs a new conversation on its application sockets. It performs the software equivalent of raising data set controls and originating or preparing to answer a call.

The softblock signals entry into the RUNNING state 192 by emitting a "BLOCK-RUNNING" status message. The RUNNING state is the normal processing state of the block. In this state, the block processes data at its application sockets. In addition, the block must recognize and respond to path control commands.

To begin operation of the system according to the present invention, the HP loads it UNIX-compatible operating system or its equivalent from disk, and initializes its HPCM, IPC and buffer allocation components. The operator executes the LI, a normal program, which initializes its components. The LI provides commands for loading of each IOP in the system with binary "image" files containing all modules to be executed in the IOP. The LI then starts the IOP's execution of that code.

IOP initialization code locates all communication interfaces available in its address space, and initiializes data structures necessary to operate the scheduler kernel and provide message services. A task is then created for the Local Path Control Manager or LPCM, which becomes the first process in the system. Its subsidiary tasks include IPC and buffer monitor tasks.

Figure 13:
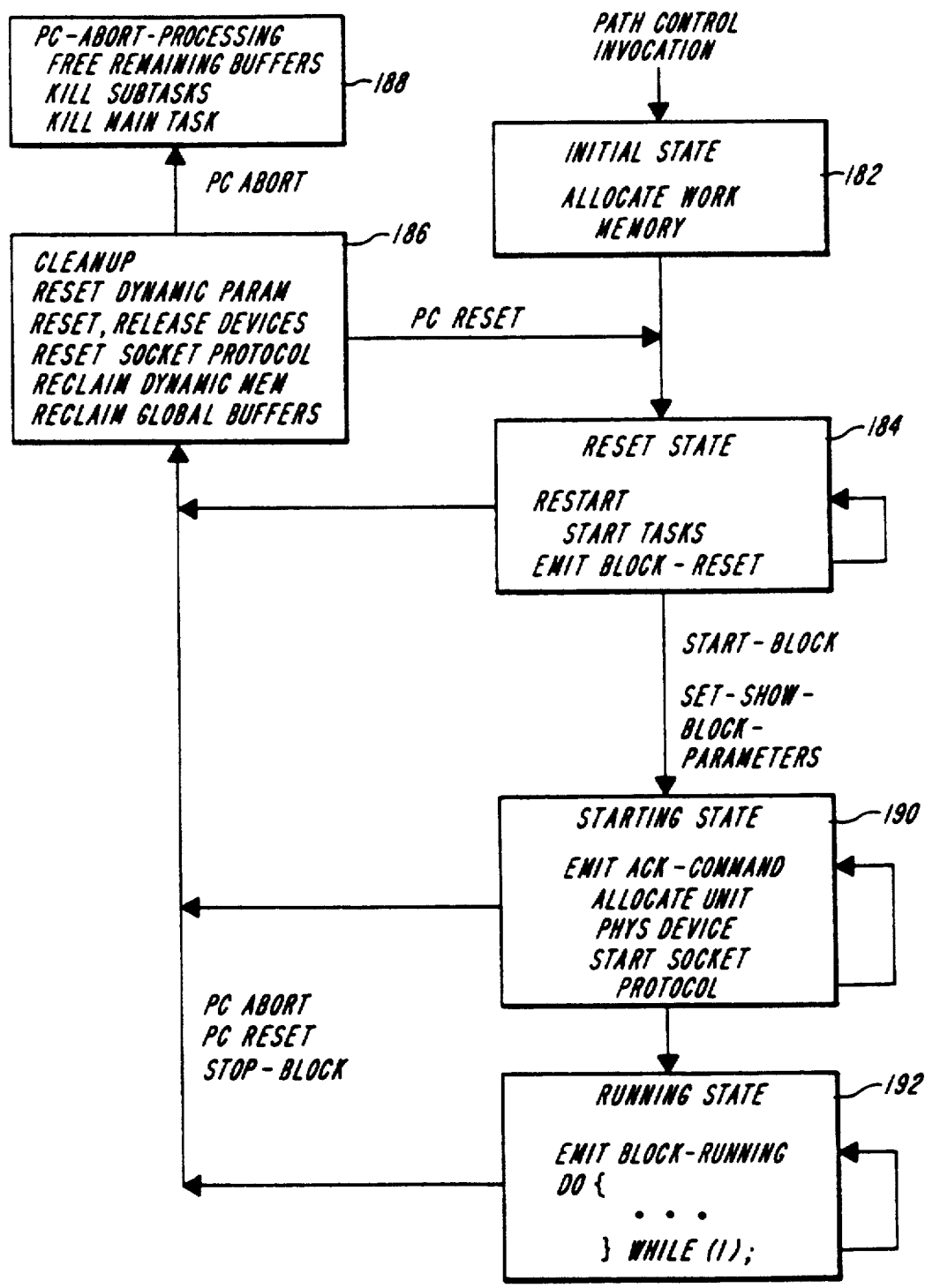
FIG. 13 shows a softblock state diagram according to the system according to the present invention.

The Local Path Control Manager (LPCM) is the primary component of the supervisory layer of the IOP system environment. The primary function of the LPCM is to control the operation of all PPMs. To accomplish this control, the LPCM requires all PPMs to adhere to the following state diagram of FIG. 13.

The LPCM initializes itself, and then waits for commands from the HPCM, which in turn waits for LI input. Operator commands to the SLI cause the LPCM to create processes as softblocks, executing the code of modules loaded into the IOP. After blocks are created, LI commands to create connections between sockets result in LPCM creation of data structures linking elements in the socket lists of the processes involved. As each process executes message operations to transmit and receive buffers over these connections, the system scheduler may cause tasks to wait and restart as data or connections become available. Operator manipulation of the connections through LI commands results only in switching of the data stream, without loss of data.

Normal termination of a process occurs when its last task terminates by calling a system service to terminate. The IOP as a whole is shut down when its first process, the LPCM, terminates. Shutdown of one IOP does not affect other IOPs or the HP.

A protocol module comes into existence as a task through the initialization operations of the path control manager (PCM). A kernel task initialization requires only an entry point and a priority (stack size and other controlled attributes may be added) but a module initialization requires considerably more. Before the task is given control, its label must be allocated, input and output connections within that label must be made, and any shared data structures must be allocated and made accessible as "common" memory.

The sequence of PCM actions required in initializing a PPM is as follows:
 1) allocate process label
 2) assign module name, invocation number, and other ID information
 3) make connections between new label's sockets and other module's sockets
 4) allocate supervisor message connection
 5) allocate service request message connection
 6) start first task
 7) wait for first task to send a status message indicating sucessful initialization
 8) issue any commands to query or set parameters
 9) send a "RUN" command, releasing the task to process messages.

Subsidiary tasks are created by the first task. This would normally take place during initialization, but may take place dynamically during processing. Task creation is performed by a service request operation; other operations exist for task deletion (self and subsidiary), task status inquiry, task priority modification, etc. The first task receives notification of command arrival on any blocked message operation; it will normally continue to receive and process commands for the life of the process. If it should be deleted, the commands are inherited by its "eldest son" task.

Additional information in the process label besides the socket array is necessary to operate the PPM. As indicated in FIG. 9 the PPM's interaction with the PCM through status and control message access points, and with the kernel and system environment through request and response message access points, requires extension of the array. More information is necessary, however, to permit the PCM to initialize the process, to control its tasks as they are created, and to provide access to a common data area used by those tasks.

The process label information includes data structure type identification, PPM identification, process identification, cluster member task identification (number, list and states), input message sockets (number and list), input event sockets (number and list), output event sockets (number and list), cluster common data area address, and other miscellaneous switching system control information.

Many I/O devices, such as the Zilog SCC, cause interrupts after data transfer and state changes. These are vectored to interrupt handler code that cooperates with base-level code to transfer data; these interrupt handler routines can be considered tasks for the purpose of design, although they are not scheduled and do not add to system overhead.

The distributed buffer manager is responsible for placing identifying information in the buffer header at allocation; it is the responsibility of the message level implementation, and each PPM processing the buffer, not to alter this header information. On release of the buffer to the distributed buffer manager, which may take place on a different CPU than the one on which it was allocated, the distributed buffer manager is responsible for routing the release request back to the buffer manager module on the original CPU.

Other than buffer header information used by the distributed buffer manager, no message structure whatsoever is assumed by the switching system. A message's data is simply an arbitrary number of bytes; in particular, alignment to integer or long boundaries is not guaranteed. A C-style null-terminated string, for example, is no different from other data; the null must be included in the data byte count for the message.

The PCM is responsible for preparing the PPM to receive control. This requires installation of the module's code, invocation of a process to run the code, and connection of the module's sockets to permit messages to flow in and out of the PPM.

A PPM is invoked upon the installed module's code by creation of a process label with associated common data area. Labels are linked together into a process tree, and are also chained in association with the module's code.

The sockets represented on the label of the process may be connected in two ways: either by preconnections specified by the module's defining data structures, or by LI connection statements implemented by the PCM.

Preconnections are typically supervisory and service message connections, and connections among event or message sockets on the process' label that are used to synchronize or manage message processing. They occur before the PPM gets control at the "init" transition.

The LI-specified connections are protocol message paths. They typically are made with the PPM in the initialized state, but may also be made in the paused state. All sockets need not be connected before the PPM is released through the "run" transition. (If a message operation addresses an unconnected socket, error ERR_NCR "no connection resolution" is returned.)

A process is normally terminated by the "halt" command, which causes the PPM to pass from the "running" state to the "initialized" state. This leaves the process active, with all initialized tasks still alive. A "remove" command then invokes the "abort" transition's PPM code, if any, to permit the PPM to kill these tasks and perform any other cleanup.

The process may have created one or more softblocks; the preferred termination method would have the primary softblock kill its subtasks before termination using the "abort" hook. If any subtask softblocks remain after this hook, they are killed by the PCM.

When a module is fully terminated (its last process is terminated), its code is still resident in memory and listed in the PCM's module inventory. It may remain there, to be reinvoked if necessary. An LI "REMOVE (block-name)" command, however, will cause the PCM to release the module's memory and remove it from the module inventory. No further invocation may be made, until it is re-INSTALLed from disk file.

Connections have an independent existence from modules and processes. A connection left behind by a PPM's termination may contain unprocessed buffers, unless buffer is in module, which will remain in the connection queue until it is reconnected. A connection may be disconnected at both ends, and contain such data buffers. In order to remove and delete a connection, an LI DELETE command must be executed by the PCM; this operation involves emptying the queue of all buffers, returning the buffers to buffer management, and deleting the connection's data structure. The connection's name, if any, also is deleted. The connection may not be used in any further LI CONNECT or LINK commands.

The PCM is responsible, with the message layer, for implementing data structures and operations that execute the message operation repertoire. This implementation is properly a design specification issue, but is of such importance that a general overview is appropriate here. Queued messages present significant problems to the implementer due to the size of the system and its dynamic change. Event connections are easily implemented as mailbox intertask messages, and will not be discussed in any great detail.

For each interface to path control, an application interface library is provided to simplify (and standardize) the details of formatting message buffers and reporting errors. The library provides the full set of host path control services to potentially any softblock. The system operator interface uses this library to control the operation of the product.

What is claimed is:

1. A data protocol converter for a data communication system, said data protocol converter selectively connecting and allowing data communication between at least one data source having a first communication protocol, said data source coupled to a selected one of a plurality of data communication system input ports, and at least one data destination having a second communication protocol different from said first communication protocol, said data destination coupled to a selected one of a plurality of data communication system output ports, said data protocol converter comprising:

at least one user definable protocol processing process capable of being executed on said data communication system, each user definable protocol processing process including:

at least one logical input to recieve data from said data source, and including a data queue receiving said data;

at least one logical output; and at least first and second user selectable communication protocol translation tasks selectable from among a plurality of communication protocol translation tasks, each of said first and second communication protocol translation tasks including at least one data input and one data output;

means, responsive to user selections, for selecting said at least first and second protocol translation tasks from among said plurality of protocol translation tasks;

path connecting means, responsive to said user selections, for selectively providing a data path to interconnect and allow data communication between said data source having said first communication protocol and said data destination having said second communication protocol, said data path comprising a plurality of constituent selectively connectable data sub-paths;

said path connecting means providing a first selectively connectable data sub-path between said at least first and second communication protocol translation tasks, for connecting the input of one of said first and second communication protocol translation tasks and the output of the other of said first and second communication protocol translation tasks, between the input of said other of said first and second communication protocol translation tasks and the logical input of said protocol processing process, and between the output of said one of first and second communication protocol translation tasks and the logical output of said protocol processing process;

said path connecting means providing a second selectively connectable data sub-path between the logical input of said protocol processing process and said selected input of said data communication system connected to said data source, wherein the logical input of said protocol processing process is connected to receive data from said data source;

said path connecting means providing a third selectively connectable data sub-path between the logical output of said protocol processing process and said selected output of said data communication system connected to said data source, wherein the logical output of said protocol processing process is connected to provide protocol converted data to said data destination; and a path control manager, operative to control execution of each protocol processing process, and to maintain a flow of data along said data path from said data source to said data destination along said selectively connectable constituent first, second and third data sub-paths, according to and through the selected communication protocol translation tasks executing in said at least one protocol processing process.

2. The data protocol converter of claim 1, wherein at least one of said task provides a process command signal to said path control manager and receives a status signal from said path control manager.

3. The data protocol converter of claim 1, further including flow control means, wherein said selectively connectable data path includes a flow control register in which control data is placed by said task receiving data from said protocol processing process logical input upon receipt of said data, and said flow control register provides said control data to said task providing data to said protocol processing process logical output, for controlling transmission of the next piece of data thereto.

4. The data protocol converter of claim 1, wherein said data queue comprises a plurality of data storage locations, and means to move data sequentially through said plurality of data locations from a first location to a last location.

5. The data protocol converter of claim 4 wherein said data queue comprises a variable length element and a variable number of elements therein.

6. The data protocol converter of claim 1, wherein said data protocol converter is operable in a multiple processor system.

7. The data protocol converter of claim 6, wherein said path control manager further includes means for connecting a plurality of said tasks with data paths.

8. The data protocol converter of claim 1, wherein said path control manager includes a library of available tasks.

9. The data protocol converter of claim 1, wherein said means for selecting is responsive to operator input means providing user selections for defining a connection between a given data source and data destination through one or more protocol processes, and for altering said connection while the system is running, without interruption of the non-altered connections.

10. The data protocol converter of claim 9, wherein said path control manager further includes connection management means for controlling the selectively connectable data path connections.

11. The apparatus of claim 1, wherein said path control manager comprises a scheduling kernel.

12. A method of providing a selected communication protocol conversion between a data source having a first communication protocol and a data destination having a second communication protocol different from said first communication protocol, comprising the steps of:

operator selecting at least one protocol processing process from among a plurality of protocol processing processes executable on a data communication system;

directing said at least one protocol processing process to interconnect with said data source and data destination connected with selected ports of said data communication system, each of said selected protocol processing processes comprising at least first and second user selectable communication protocol translation tasks;

user selecting said at least first and second communication protocol translation tasks from among a plurality of communication protocol translation tasks, each of said communication protocol translation tasks including an input and an output;

directing said at least first and second communication protocol translation tasks to interconnect within said selected at least one protocol processing process wherein said communication protocol translation tasks cooperate to provide said selected communication protocol conversion;

said data communication system performing the steps of:

creating at least one process label associated with each selected process, and having task execution control parameters according to the operator selected process and the selected interconnection between a data source and a data destination;

forming an index pointing to each of said selected at least first and second tasks resident in a memory;

executing a selected process by executing said at least first and second tasks as pointed to by said index under control of its associated process label;

providing one or more intervening data queues for logically interconnecting selected processes;

forming a selected connection of one or more processes by said intervening data queues;

applying data from said data source to the first of said processes; and sending said data to said data destination from the last of said connected processes through any intervening data queues and processes.

13. The method of claim 12 further including the step of concurrently executing a plurality of selected processes.

* * * * *

UNITED STATES PATENT AND TRADEMARK OFFICE
CERTIFICATE OF CORRECTION

PATENT NO. : 5,060,140

DATED : October 22, 1991

INVENTOR(S) : Alexander S. Brown, et al.

It is certified that error appears in the above-identified patent and that said Letters Patent is hereby corrected as shown below:

```
Column 1, line 63, "number" should read --numbers--.

Column 3, line 64, "form" should read --from--.

Column 6, line 37, "plak" should read --plnk--.

Column 16, line 20, "tasks for the purpose" should read
-- tasks for the purposes--.
```

Signed and Sealed this

Thirteenth Day of July, 1993

Attest:

MICHAEL K. KIRK

Attesting Officer

Acting Commissioner of Patents and Trademarks